Patented May 5, 1942

2,282,211

UNITED STATES PATENT OFFICE 2,282,211

SULPHONE COMPOUNDS

Paul Pöhls and Robert Behnisch, Wuppertal-Elberfeld, Germany, assignors to Winthrop Chemical Company, Inc., New York, N. Y., a corporation of New York No Drawing. Application February 27, 1940, Serial No. 321,045. In Germany March 23, 1939

1 Claim. (Cl. 260—211)

This invention relates to new sulphone compounds which are useful as therapeutics.

4.4'-diamino-diphenylsulphone and 4.4'-diacetyldiamino-diphenylsulphone are known by their specific activity against streptococci and pneumococci infections. The therapeutic utility of 4.4'-diamino-diphenylsulphone, however, is affected by a strong formation of methaemoglobin. Also the 4.4'-diacetyldiamino-diphenylsulphone does not comply with all therapeutic requirements.

In accordance with the present invention new products which do not give rise to the formation of methaemoglobin and which are very well active against bacterial infections, particularly against streptococci infections, are obtainable by the manufacture of 4-acylamino-4'-azomethine-diphenylsulphones and their nuclear substitution products, that is compounds which contain in the 4'-position an amino group condensed with an aldehyde.

In accordance with the present invention the said new products are prepared by condensing 4-acylamino-4'-aminodiphenylsulphones or their nuclear substitution products with an aldehyde or with an acetale or a semiacetale of an aldehyde. The condensation may be facilitated by the addition of substances acting as catalysts, for instance by the addition of a slight quantity of the hydrochloride of a 4-acylamino-4'-aminodiphenylsulphone or by the addition of alcoholic hydrogenchloride. The new products are also obtainable by first preparing 4-aminodiphenylsulphones which contain in 4'-position an azomethine group, their nuclear substitution products respectively, and then acylating the compounds thus obtained under mild reaction conditions. The aldehydes may be taken from the aliphatic, aromatic, araliphatic, hydroaromatic or heterocyclic series, so that the 4'-amino group is present in the final product, for instance, in the form of an alkylideneamino group when using an aliphatic aldehyde, in the form of an aralkylideneamino group when using an aromatically substituted aldehyde or alkyl- or alkenylaldehyde, etc. Suitable aliphatic aldehydes are, for instance, propionaldehyde, butyraldehyde, crotonaldehyde and also polyhydroxyaldehydes of the type of aldose sugars which are present in the seminacetale form and which give rise to the formation of aldosidoamino groups, suitable aldoses are for instance galactose, glucose and maltose. Suitable aromatically substituted aldehydes are, for instance, benzaldehyde, cinnamaldehyde and their nuclear substitution products. Also furfurol may be used as aldehyde. All the said aldehydes may be used in the form of their acetales. As acyl radicals, preferably the acetyl radical is used, but also other usual acyl radicals, such as the propionyl radical, benzoyl radical and the like may be present.

The condensation products thus obtainable are practically insoluble in all usual solvents which fact renders the purification more difficult. Pure starting-materials, therefore, are preferably used.

The starting-materials are obtained, for instance, by acylating the 4-amino-4'-nitro-diphenylsulphide or its nuclear substitution products, by oxidation of the 4-acylamino-4'-nitro-diphenylsulphide, for instance by means of hydrogen peroxide to the corresponding sulphones and by reduction of the 4-acylamino-4'-nitro-diphenylsulphones to the 4-acylamino-4'-amino-diphenylsulphones.

The invention is illustrated by the following examples without, however, being restricted thereto:

*Example 1*

58 grams of 4-acetylamino-4'-amino-diphenylsulphone are boiled under reflux with 32 grams of cinnamaldehyde in 500 ccs. of alcohol. After half an hour's boiling the 4-acetylamino-4'-amino-diphenylsulphone has dissolved. After 3 hours' boiling the clear solution is cooled with ice, and the 4-acetylamino-4'-cinnamylideneamino-diphenylsulphone which has precipitated is sucked off, washed with ether and dried at 100° C. It melts at 232–234° C.

In an analogous way the 4-acetylamino-4'-(para-methylcinnamylideneamino)-, the 4'-(para-methoxycinnamylideneamino) - diphenylsulphone, respectively, are obtained with para-methyl-, para-methoxycinnamaldehyde, respectively. When starting with 4-propionylamino- or 4-benzoylamino-4'-amino-diphenylsulphone the 4-propionylamino- and the 4-benzoylamino-4'-cinnamylideneamino-diphenylsulphone are obtained.

The 4-acetylamino-4'-amino-diphenylsulphone used as starting material is prepared as follows:

500 grams of 4-amino-4'-nitro-diphenylsulphide are introduced while stirring at ordinary temperature into 2000 ccs. of acetic acid anhydride. The temperature rises to 50° C. After subsequent 3 hours' stirring at 60° C. the 4-acetylamino-4'-nitro-diphenylsulphide is sucked off after cooling, it is washed with ether and dried at 100° C. It melts at 188–189° C.

240 grams of 4-acetylamino-4'-nitro-diphenylsulphide are suspended in 2500 ccs. of glacial acetic acid and 850 ccs. of 25% aqueous hydrogen peroxide solution are added thereto. The mixture is stirred at ordinary temperature for 12 hours, whereby the 4-acetylamino-4'-nitro-diphenylsulphide dissolves. After 8 hours' stirring at 60–65° C. the 4-acetylamino-4'-nitro-diphenylsulphone precipitated is sucked off after cooling, washed with water and dried at 100° C. It melts at 216° C.

800 grams of iron, 1500 ccs. of water and 10 ccs. of glacial acetic acid are boiled under reflux while stirring and 320 grams of 4-acetylamino-4'-nitro-diphenylsulphone, suspended in 1000 ccs. of dioxane, are added thereto drop by drop. After 4 hours' stirring and boiling the reaction solution is made alkaline by way of potassium carbonate and filtered while hot with animal charcoal. The 4-acetylamino-4'-amino-diphenylsulphone crystallizes from the filtrate after the dilution with water, which after sucking off, washing with water and drying at 100° C. melts at 230° C.

In an analogous manner the 4-propionylamino- and 4-benzoylamino-compounds are obtainable.

According to another method 30 grams of 4.4'-diaminodiphenylsulphone are boiled in 50 ccs. of glacial acetic acid for 4 hours under reflux. After cooling the 4-acetylamino-4'-amino-diphenylsulphone crystallizes from the solution and melts at 228° C.

*Example 2*

29 grams of 4-acetylamino-4'-amino-diphenylsulphone are boiled under reflux with 15 grams of para-methoxybenzaldehyde and 500 ccs. of alcohol for 7 hours. The clear solution is concentrated and the 4-acetylamine-4'-(4"-methoxybenzylideneamino)-diphenyl-sulphone which has crystallized out is sucked off, washed with ether and dried at 100° C. It melts at 210–211° C.

In a corresponding manner the following products are obtained: When using ortho-hydroxybenzaldehyde the 4-acetylamino-4'-(2"-hydroxybenzylideneamino) - diphenylsulphone melting at 244–246° C.; when using 3.4-methylenedioxybenzaldehyde the 4 - acetylamino-4'- (3".4" - methylenedioxybenzylideneamine) - diphenylsulphone melting at 219–220° C.; when using the 4-toluylenealdehyde the 4-acetylamino - 4' - (4" - methylbenzylideneamino) - diphenylsulphone melting at 238–239° C.

In the same manner higher monoacyl compounds of the 4.4'-diaminodiphenylsulphone can be condensed with the said aldehydes.

*Example 3*

29 grams of 4-acetylamine-4'-amino-diphenylsulphone are boiled under reflux with 6.5 grams of propionaldehyde in 250 ccs. of alcohol for 6 hours. The clear solution is evaporated, the residue is taken up with alcohol three times and again evaporated under reduced pressure. The 4 - acetylamino - 4' - propylideneamino - diphenyl-sulphone melts at 130–131° C. while decomposing.

In the same manner the 4-acetylamino-4'-crotylideneamino-diphenylsulphone melting at 121–122° C. while decomposing is obtained from 29 grams of 4-acetylamine-4'-amino-diphenylsulphone and 8 grams of crotonaldehyde.

*Example 4*

13 grams of 4-acetylamino-4'-amino-diphenylsulphone, 200 ccs. of methanol, 17 grams of maltose and 0.5 gram of ammonium chloride are heated to boiling under reflux while stirring for such a long time until a test portion after evaporation yields a clear solution in water. This happens after about 24 to 30 hours. After a short boiling up of the mixture with animal charcoal the reaction solution is filtered, the filtrate evaporated to dryness, the residue treated with methanol and the filtered solution is added to a mixture of ether and alcohol in the proportion of 4:1 while stirring. The somewhat smeary precipitate solidifies soon and then is filtered with suction, washed with ether and dried at 50° C. in vacuo. A yellowish-white powder is obtained which readily dissolves in water with neutral reaction.

We claim:

A 4 - acetylamino-4'-maltosoamino-diphenylsulphone.

PAUL PÖHLS.
ROBERT BEHNISCH.